(12) United States Patent
Southard

(10) Patent No.: US 11,851,358 B1
(45) Date of Patent: Dec. 26, 2023

(54) OPTICAL ELEMENT SHAPING SYSTEMS

(71) Applicant: Danbury Mission Technologies, LLC, Colorado Springs, CO (US)

(72) Inventor: Bari M. Southard, Bridgewater, CT (US)

(73) Assignee: Danbury Mission Technologies, LLC, Colorado Springs, CO (US)

( * ) Notice: Subject to any disclaimer, the term of this patent is extended or adjusted under 35 U.S.C. 154(b) by 578 days.

(21) Appl. No.: 14/996,191

(22) Filed: Jan. 14, 2016

(51) Int. Cl.
*C03B 23/00* (2006.01)
*G02B 5/08* (2006.01)
*C03C 23/00* (2006.01)

(52) U.S. Cl.
CPC ...... *C03B 23/0066* (2013.01); *C03C 23/0025* (2013.01); *G02B 5/08* (2013.01)

(58) Field of Classification Search
CPC . C03B 23/0066; C03B 23/0086; C03B 23/02; C03B 23/04; C03B 23/18; C03C 23/0025; C03C 23/007; C03C 23/0005; G02B 5/08
USPC .......................................................... 359/838
See application file for complete search history.

(56) References Cited

U.S. PATENT DOCUMENTS

| | | | | |
|---|---|---|---|---|
| 3,629,546 A | * | 12/1971 | Fry ........................... | 219/121.84 |
| 4,127,926 A | * | 12/1978 | White .................. | B21D 53/883 |
| | | | | 29/453 |
| 4,416,257 A | * | 11/1983 | Bale ......................... | F24S 40/58 |
| | | | | 126/610 |
| 5,228,324 A | * | 7/1993 | Frackiewicz .......... | B21D 11/20 |
| | | | | 72/342.1 |
| 5,247,153 A | * | 9/1993 | Pasch .................. | G03F 7/70241 |
| | | | | 219/121.68 |
| 5,489,321 A | * | 2/1996 | Tracy .................... | C03B 23/245 |
| | | | | 65/43 |
| 6,142,642 A | | 11/2000 | Krisko et al. | |
| 6,530,668 B2 | | 3/2003 | Krisko | |
| 8,467,124 B2 | | 6/2013 | Thiel | |
| 8,585,225 B2 | | 11/2013 | O'Connor et al. | |
| 8,816,252 B2 | * | 8/2014 | Bisson ................ | C03B 23/0258 |
| | | | | 219/388 |
| 9,184,321 B2 | * | 11/2015 | Molnar ..................... | G02B 5/10 |
| 2005/0133485 A1 | * | 6/2005 | Tokura .................... | B21D 11/20 |
| | | | | 219/121.6 |
| 2011/0127244 A1 | * | 6/2011 | Li .......................... | C03B 33/091 |
| | | | | 219/121.69 |
| 2013/0139964 A1 | | 6/2013 | Hofmann et al. | |
| 2014/0147624 A1 | * | 5/2014 | Streltsov ................ | C03C 3/083 |
| | | | | 428/138 |
| 2016/0199936 A1 | * | 7/2016 | Luten ................. | B23K 26/0624 |
| | | | | 359/275 |

\* cited by examiner

*Primary Examiner* — Stephone B Allen
*Assistant Examiner* — Rahman Abdur
(74) *Attorney, Agent, or Firm* — Fish & Richardson P.C.

(57) ABSTRACT

A method for shaping an optical element includes heating a first surface of an optical element, and allowing the first surface of the optical element to cool, thereby causing residual stress in the first surface which deforms the optical element to a predetermined shape. Heating can include applying a laser to the first surface.

6 Claims, 3 Drawing Sheets

OPTICAL ELEMENT SHAPING SYSTEMS

BACKGROUND

1. Field

The present disclosure relates to optical element systems, more specifically to optical element shaping systems.

2. Description of Related Art

Traditional methods for shaping and polishing of optical elements (e.g., mirrors, lenses) to final figure involve very time consuming processes. Traditional processes are requiring many cycles between polishing, cleaning and metrology stations.

Such conventional methods and systems have generally been considered satisfactory for their intended purpose. However, there is still a need in the art for improved optical element shaping systems. The present disclosure provides a solution for this need.

SUMMARY

A method for shaping an optical element includes heating a first surface of an optical element, and allowing the first surface of the optical element to cool, thereby causing residual stress in the first surface which deforms the optical element to a predetermined shape. Heating can include applying a laser to the first surface.

Applying the laser to the first surface can include controlling one or more characteristics of the laser to produce a predetermined heating effect and corresponding deformation of the optical element. Controlling one or more characteristics of the laser can include controlling at least one of intensity, beam width, scan rate, or exposure time.

Applying the laser to the first surface can include applying the laser to an R2 surface of the optical element to shape an R1 surface thereof. In certain embodiments, applying the laser to the first surface includes applying the laser to an R1 surface of the optical element to shape the R1 surface. Applying the laser to the first surface can include applying the laser to one or more side surfaces of the optical element to shape an R1 surface of the optical element.

Applying the laser to the first surface can include applying the laser uniformly across the entire surface to cause a uniform deformation of the optical element. In certain embodiments applying the laser to the first surface includes applying the laser to predetermined portions of the first surface to cause a predetermined non-uniform deformation of an R1 surface of the optical element.

In accordance with at least one aspect of this disclosure, an optical element can include a residual stress layer having a layer thickness less than a thickness of the optical element, wherein the residual stress layer causes and maintains a deformation of an R1 surface of the optical element. The residual stress layer can be an R2 surface of the optical element. In certain embodiments, the residual stress layer is the R1 surface of the optical element. The residual stress layer can include at least one side surface of the optical element. The optical element can be a mirror or any other suitable optical element.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
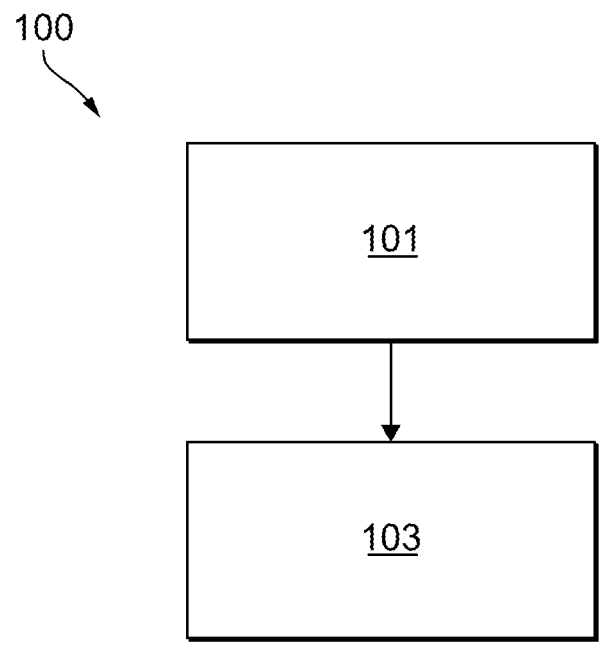
FIG. 1 is a flow chart diagram of an embodiment of method in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2A-3B. The systems and methods described herein can be used to shape optical elements.

Figure 2A:
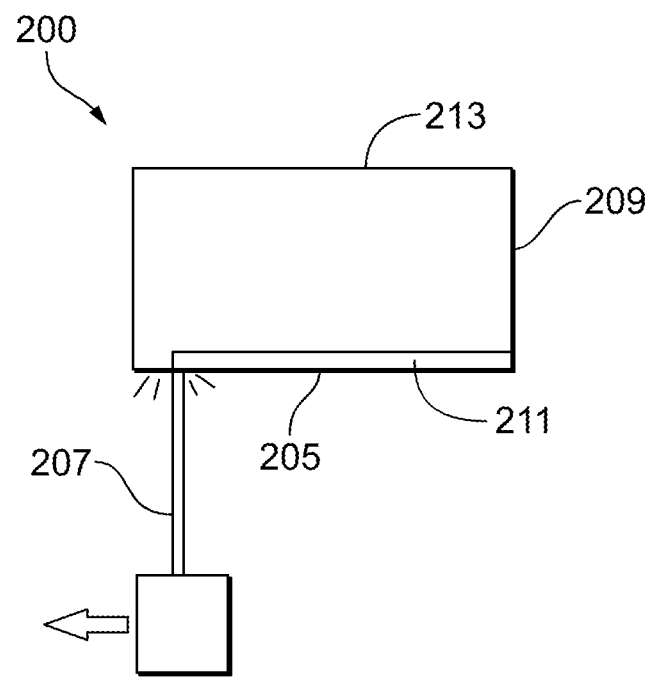
FIG. 2A is a cross-sectional elevation view of an embodiment of an optical element in accordance with this disclosure, shown during uniform lasing.
Figure 2B:
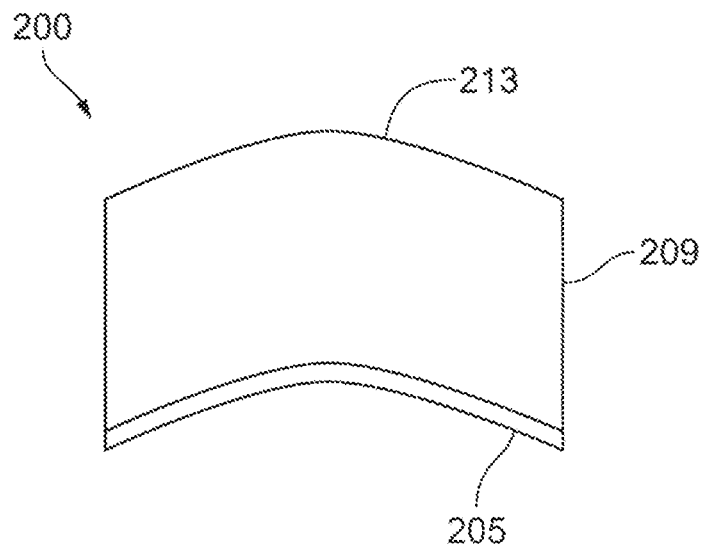
FIG. 2B is a cross-sectional elevation view of the optical element of FIG. 2A shown after lasing and cooling.

Referring to FIGS. 1 and 2A, a method 100 for shaping an optical element (e.g., element 200 shown in FIG. 2) includes heating 101 a first surface 205 of an optical element 200. The method 100 also includes allowing 103 the first surface 205 of the optical element 200 to cool for causing a residual stress in the first surface 205 which deforms the optical element 200 to a predetermined shape. Heating 101 can include applying a laser 207 to the first surface 205, as shown in FIGS. 2A-2B. Any suitable laser 207 can be utilized. However, it is contemplated that any other suitable heating source can be used (e.g., to rapidly heat first surface 205).

Applying the laser 207 to the first surface 205 can include controlling one or more characteristics of the laser 207 to produce a predetermined heating effect and corresponding deformation of the optical element 200. For example, controlling one or more characteristics of the laser 207 can include controlling at least one of intensity, beam width, scan rate, or exposure time.

In certain embodiments, applying the laser 207 to the first surface 205 can include applying the laser to the first surface 205 to shape a second surface 213. In certain embodiments, the first surface 205 is an R2 surface (e.g., a back surface) of the optical element 200 and the second surface 213 is an R1 surface (e.g., a front surface) of the optical element 200. The first surface 205 and the second surface 213 can be or any other suitable surfaces. Also, it is not necessary that a second surface 213 be deformed by applying a laser to the first surface 205 (e.g., the laser can be applied to a first surface 205 to deform the first surface 205).

For example, in certain embodiments, applying the laser 207 to the first surface 205 includes applying the laser to an R1 surface of the optical element 200 to shape the R1 surface or any other suitable surface thereof. While not shown, applying the laser 207 to the first surface 205 can include applying the laser 207 to one or more side surfaces 209 of the optical element to shape the first surface 205 (e.g., and R2 surface), the second surface 213 (e.g., an R1 surface), or any other suitable surface of the optical element 200.

Referring to FIGS. 2A and 2B, applying the laser 207 to the first surface 205 can include applying the laser 207 uniformly across the entire surface 205 to cause a uniform deformation of the optical element 200 (e.g., as shown in FIG. 2B) and/or the R1 surface. For example, the laser 207 can be scanned across the first surface 205 uniformly, and/or a wide area laser 207 could be utilized to cause a uniform heated surface layer 211 (as shown in FIG. 2A) which, when cooled, will retain residual stress and uniformly deform the optical element 200 (e.g., thereby deforming a second surface 213 of the optical element 200).

Figure 3A:
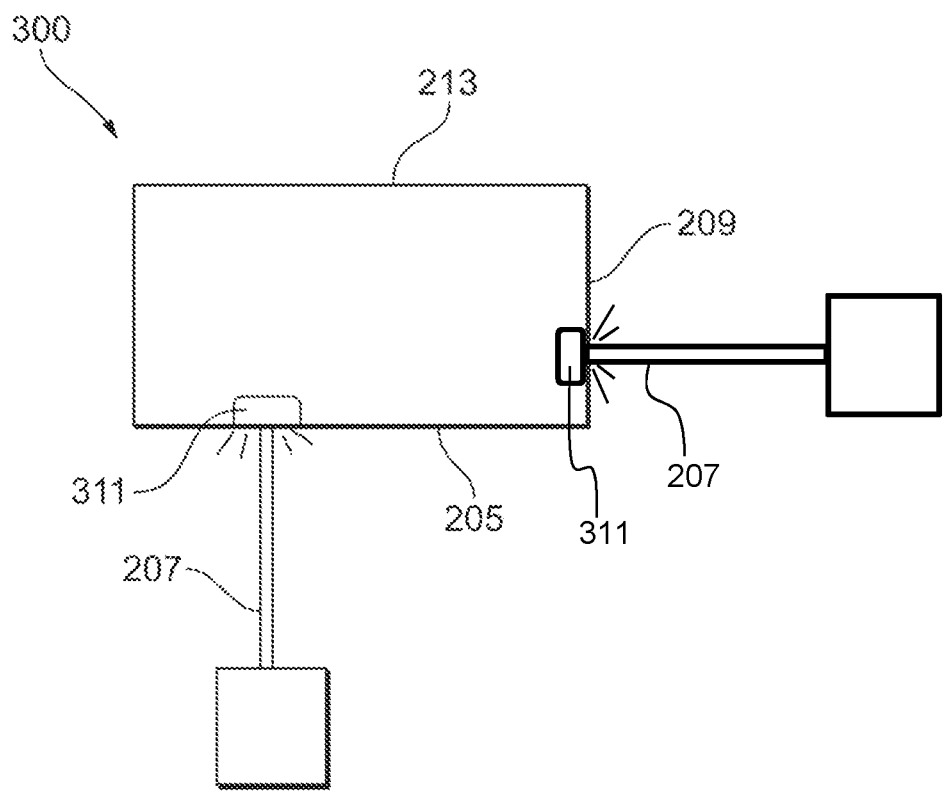
FIG. 3A is a cross-sectional elevation view of an embodiment of an optical element in accordance with this disclosure, shown during non-uniform lasing.
Figure 3B:
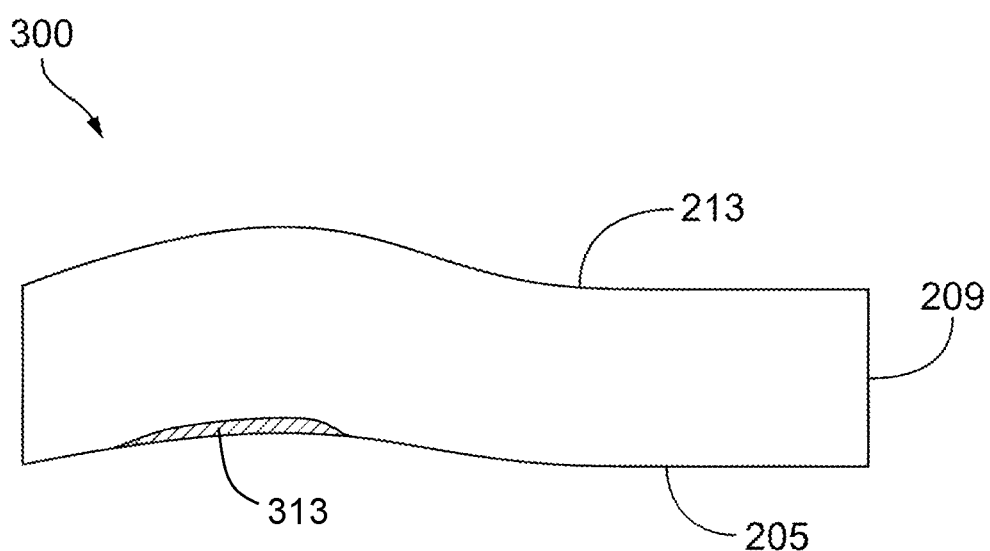
FIG. 3B is a cross-sectional elevation view of the optical element of FIG. 3A shown after lasing and cooling.

Referring to FIGS. 3A and 3B, in certain embodiments applying the laser 207 to the first surface 205 includes applying the laser 207 to predetermined portions of the first surface 205 to cause a predetermined non-uniform deformation of a second surface 213 (e.g., an R1 surface) of the optical element 300. For example, as shown in FIG. 3A, the laser 207 can be applied to create a heated surface portion 311 which, when cooled, can cause a deformation in the first surface 205 and a corresponding deformation (not necessarily of the same shape or size) in the second surface 213. In certain embodiments, several small patches and/or patterns of heat affected zone(s) 313 (see FIG. 3B) can be applied to any suitable surface (e.g., first surface 205) to achieve a desired shape of the same surface or any other surface (e.g., second surface 213).

It is contemplated that embodiments and/or suitable portions thereof of method 100 can be implemented on a controller (not shown) operatively connected to the laser 207. The controller can be operatively connected to one or more sensors (e.g., a thermal/temperature sensor, not shown) to provide feedback to the controller to produce a desired effect from the laser 207.

In accordance with at least one aspect of this disclosure, referring to FIGS. 2A-3B, an optical element 200, 300 can include a residual stress layer (e.g., first surface 205), the residual stress layer having a layer thickness less than a thickness of the optical element 200, 300. The residual stress layer causes and maintains a deformation of an R1 surface of the optical element 200, 300. The residual stress layer can be an R2 surface of the optical element 200, 300. In certain embodiments, the residual stress layer is the R1 surface of the optical element 200, 300. The residual stress layer can include at least one side surface 209 of the optical element 200, 300.

Using systems and methods as described above, the shape of an optical element surface (e.g., an R1 mirror surface of a front surface mirror) can be permanently changed in a controlled manner by temporary heating to the extent that creeping of the glass occurs (since it softens) such that upon cooling there is a small residual stress/strain, due to the differing thermal history with the surrounding material, that influences the shape of the optical element surface. As described above, any surface, including the R1 surface itself, may be subjected to heating. The superposition of the various shape changes resulting from multiple independently controlled heating operations at various locations can result in the desired shape of the R1 surface or any other suitable surface.

The methods and systems of the present disclosure, as described above and shown in the drawings, provide for methods and systems for shaping optical elements with superior properties including dramatically reduced time and improved efficiency. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for shaping an optical element, comprising:
heating a first surface of the optical element by applying a first quantity of laser radiation to a portion of the first surface that does not extend to any lateral edge of the first surface, wherein the first surface is a back R2 surface of the optical element that is opposite a second surface of the optical element that is a front R1 surface of the optical element;
applying a second quantity of laser radiation to a third surface of the optical element that is a side surface of the optical element to shape the second surface of the optical element;
allowing the first and third surfaces of the optical element to cool, thereby causing residual stress in the first and third surfaces, wherein the residual stresses shape the second surface of the optical element by deforming the second surface of the optical element,
wherein applying laser radiation to the portion of the first surface comprises applying the radiation directly to the first surface without passing the radiation through the second surface.

2. The method of claim 1, wherein applying the laser radiation to the portion of the first surface comprises controlling one or more characteristics of the laser radiation to produce a predetermined heating effect and corresponding deformation of the optical element.

3. The method of claim 2, wherein controlling one or more characteristics of the laser radiation comprises controlling at least one of intensity, beam width, scan rate, and exposure time.

4. The method of claim 1, further comprising applying the laser radiation to multiple portions of the first surface to cause a predetermined non-uniform deformation of the first surface of the optical element, wherein each of the multiple portions of the first surface does not extend to any lateral edge of the first surface.

5. An optical element, comprising:
an R1 front surface;
an R2 back surface;
a side surface;
a residual stress portion of the R2 back surface that does not extend to any lateral edge of the R2 back surface and has a thickness less than the thickness of the optical element; and
a residual stress portion of the side surface,
wherein the residual stress portions cause and maintain a deformation of the R1 front surface of the optical element by bending the optical element; and
wherein the residual stress portion in the back surface does not extend through the optical element to the front surface of the optical element.

6. The optical element of claim 5, wherein the optical element is a mirror.

\* \* \* \* \*